United States Patent
James et al.

(10) Patent No.: US 12,053,886 B2
(45) Date of Patent: Aug. 6, 2024

(54) DEVICE CONTROL USING POLICY TRAINING BASED ON TASK EMBEDDINGS

(71) Applicant: Imperial College Innovations Limited, London (GB)

(72) Inventors: Stephen Lloyd James, Bridgend (GB); Michael Bloesch, London (GB); Andrew Davison, London (GB)

(73) Assignee: Imperial College Innovations Limited, London (GB)

( * ) Notice: Subject to any disclaimer, the term of this patent is extended or adjusted under 35 U.S.C. 154(b) by 615 days.

(21) Appl. No.: 17/207,281

(22) Filed: Mar. 19, 2021

(65) Prior Publication Data

US 2021/0205988 A1 Jul. 8, 2021

Related U.S. Application Data

(63) Continuation of application No. PCT/GB2019/052520, filed on Sep. 10, 2019.

(30) Foreign Application Priority Data

Sep. 21, 2018 (GB) ..................................... 1815431

(51) Int. Cl.
*B25J 9/16* (2006.01)
*G05B 19/4155* (2006.01)

(52) U.S. Cl.
CPC .............. *B25J 9/163* (2013.01); *B25J 9/1661* (2013.01); *G05B 19/4155* (2013.01)

(58) Field of Classification Search
CPC .......... B25J 9/163; B25J 9/1661; B25J 9/161; G05B 19/4155; G05B 2219/31263; G05B 2219/39376; G06N 3/084; G06N 3/008; G06N 3/045; G06N 3/08
USPC .......................................................... 700/47
See application file for complete search history.

(56) References Cited

U.S. PATENT DOCUMENTS

| | | |
|---|---|---|
| 2013/0245824 A1 | 9/2013 | Barajas et al. |
| 2015/0336268 A1* | 11/2015 | Payton ................. G05B 19/423 901/3 |
| 2016/0096272 A1 | 4/2016 | Smith et al. |
| 2019/0232488 A1* | 8/2019 | Levine ................. G05B 19/042 |

(Continued)

OTHER PUBLICATIONS

Kralev, R. et al.; "Learning to Reinforcement by Imitation", 13 pages, Sep. 28, 2018. (Year: 2018).*

(Continued)

*Primary Examiner* — Chun Cao
(74) *Attorney, Agent, or Firm* — EIP US LLP

(57) ABSTRACT

A control system for a robotic device comprising a task embedding network to receive one or more demonstrations of a task and to generate a task embedding. The task embedding comprises a representation of the task, and each demonstration comprises one or more observations of a performance of the task. The control system includes a control network to receive the task embedding from the task embedding network and to apply a policy to map a plurality of successive observations of the robotic device to respective control instructions for the robotic device. The policy applied by the control network is modulated across the plurality of successive observations of the robotic device using the task embedding from the task embedding network.

6 Claims, 9 Drawing Sheets

(56) References Cited

U.S. PATENT DOCUMENTS

2020/0276703 A1* 9/2020 Chebotar ............... B25J 9/1664

OTHER PUBLICATIONS

International Search Report and Written Opinion dated Jan. 24, 2020 for PCT Application No. PCT/GB2019/052520.
United Kingdom Combined Search and Examination Report dated Mar. 25, 2019 for GB Application No. GB1815431.0.
Duan et al., "One-Shot Imitation Learning", Dec. 4, 2017, 31st Conference on Neural Information Processing Systems (NIPS 2017), Long Beach, CA, USA, pp. 1-15, available from https://arxiv.Org/pdf/1703.07326.pdf.
Hausman et al., "Learning an Embedding Space for Transferable Robot Skills", Feb. 24, 2018, pp. 1-16, available from https://openreview.net/fomm?id=rk07ZXZRb.
Nakajo et al., "Acquisition of Viewpoint Transformation and Action Mappings via Sequence to Sequence Imitative Learning by Deep Neural Networks", Frontiers in Neurorobotics vol. 12, Jul. 24, 2018 (Ju. 24, 2018, Article 46, pp. 1-14 DOI: 10.3389/fnbot.2018.00046.
Yuxuan et al., "Imitation from Observation: Learning to Imitate Behaviors from Raw Video via Context Translation", 2018 IEEE International Conference on Robotics and Automation (ICRA), IEEE, May 21, 2018 (May 21, 2018), pp. 1118-1125, S3S9/ICRA. 2018.8462901.
Finn et al., "One-Shot Visual Imitation Learning via Meta-Learning" Sep. 14, 2017, Conference on Robot Learning, 2017.
Finn et al., Model-Agnostic Meta-Learning for Fast Adaptation of Deep Networks, Mar. 9, 2017, ICML 2017.

* cited by examiner

DEVICE CONTROL USING POLICY TRAINING BASED ON TASK EMBEDDINGS

CROSS-REFERENCE TO RELATED APPLICATIONS

This application is a continuation of International Application No. PCT/GB2019/052520, filed Sep. 10, 2019 which claims priority to UK Application No. GB 1815431.0, filed Sep. 21, 2018, under 35 U.S.C. § 119(a). Each of the abovereferenced patent applications is incorporated by reference in its entirety.

BACKGROUND

Field of the Invention

The present invention relates to control of a device, such as a robotic device, using a representation of a task, referred to herein as a task embedding. In certain embodiments, the present invention relates to processing at least one observation of a demonstration of a task in a manner that enables the task to be performed by the device. The invention has particular, but not exclusive, relevance to the field of imitation learning and few-shot learning.

Description of the Related Technology

Humans and animals are capable of learning new information rapidly from very few examples, and apparently improve their ability to 'learn how to learn' throughout their lives. Endowing devices such as robots with a similar ability would allow for a large range of skills to be acquired efficiently, and for existing knowledge to be adapted to new environments and tasks.

Two areas that attempt to emulate the learning ability of humans and animals are imitation learning and meta-learning. Imitation learning aims to learn tasks by observing a demonstrator. Meta-learning aims to teach machines how to learn to learn. Many one-shot and few-shot learning methods in image recognition are a form of meta-learning, where it is desired to learn from a small number of examples (e.g. at test time). In these cases, systems are tested on their ability to learn new tasks, rather than the usual approach of training on a single task and testing on unseen examples of that task. Common forms of meta-learning include recurrence, metric learning, learning an optimiser, and model-agnostic meta-learning (MAML). Another approach is inverse reinforcement learning, where an agent attempts to estimate a reward function that describes the given demonstrations.

A common issue in imitation learning is the large amount of data needed to train such systems. Few-shot learning is difficult to achieve in practice. There is often the issue that tasks are learned independently, where learning one task does not accelerate the learning of another.

An emerging trend in robotics is to learn control directly from raw sensor data in an end-to-end manner Such approaches have the potential to be general enough to learn a wide range of tasks, and they have been shown to be capable of performing tasks that older methods in robotics have found difficult, such as coordination between vision and control, or in tasks with dynamic environments. However, these solutions often learn their skills from scratch and need a large amount of training data. Given this, it is desired to develop methods that improve data efficiency.

In the paper "One-shot visual imitation learning via meta-learning" by C. Finn, T. Yu, T. Zhang, P. Abbeel, and S. Levine published at the Conference on Robot Learning, 2017, a meta-imitation learning method is presented that enables a robot to learn how to learn, enabling the robot to learn new tasks, end-to-end, from a single visual demonstration. Demonstration data from a number of other tasks is re-used to enable efficient learning of new tasks. A policy is trained that maps observations to predicted actions. An extension of Model-Agnostic Meta-Learning (MAML) is presented to provide imitation learning. In this case, during meta-training, pairs of demonstrations are used as training-validation pairs. At meta-test time, one demonstration for a new task is provided and a model is updated to acquire a policy for the new task. The policy then enables outputs to be predicted based on observations for the new task. The parameters of the policy are parameters for a neural network architecture. The neural network architecture maps an RGB image into image features. Those image features are concatenated with a robot configuration vector and bias parameters, before being mapped to robot actions.

Model-Agnostic Meta-Learning, while a useful step forward, has a number of limitations with regard to robotic systems. For example, once a policy is trained, it cannot accomplish any of the tasks seen during training unless it is given an example again at test time. Also, once a specific task is learned, the method can lose its ability to meta-learn and be stuck with a set of weights that can only be used for that one task. One way around this is to make a copy of the weights needed for each task, but this raises scalability concerns.

Given existing techniques, there is a desire for efficient ways to teach a robotic device to learn new tasks.

SUMMARY

According to a first aspect of the present invention there is provided a control system for a robotic device comprising: a task embedding network to receive one or more demonstrations of a task and to generate a task embedding, the task embedding comprising a representation of the task, each demonstration comprising one or more observations of a performance of the task; and a control network to receive the task embedding from the task embedding network and to apply a policy to map a plurality of successive observations of the robotic device to respective control instructions for the robotic device, wherein the policy applied by the control network is modulated across the plurality of successive observations of the robotic device using the task embedding from the task embedding network.

In certain examples, the task embedding network and the control network each comprise respective parameters resulting from joint training on a training set comprising training samples of at least one training task in at least one environment, each training sample comprising one or more observations of a given training task in a given environment and corresponding actions performed by the robotic device in the given environment.

In certain examples, at least one of the task embedding network and the control network are trained on a training set comprising training samples of at least one training task; the at least one training task comprises a first task; and the task received by the task embedding network is a second task, different from the first task, such that the control network is configured to apply the policy to map the plurality of successive observations of the robotic device to the respective control instructions for the robotic device to perform the second task.

In certain examples, the one or more demonstrations of the task comprise one or more observations of the performance of the task in a first environment, the control instructions comprise control instructions for the robotic device to perform the task in a second environment, the first and second environments having at least different configurations, and the plurality of successive observations of the robotic device comprise observations of the robotic device in the second environment.

In certain examples, the one or more observations of the performance of the task comprise image data representative of at least one image of the robotic device performing the task and wherein the control instructions comprise motor control instructions for one or more motors of the robotic device.

In certain examples, the task embedding network and the control network each comprise respective parameters resulting from joint training on a training set comprising training samples of at least one training task in at least one simulated environment, each training sample comprising one or more observations of a given training task in a given simulated environment and corresponding actions performed by a simulation of the robotic device in the given simulated environment.

The control system of the first aspect may be configured any features of a second aspect of the present invention, described below.

According to the second aspect of the present invention there is provided a method of controlling a robotic device, the method comprising: receiving at least one observation of a task being performed in a first context; generating a task embedding based on the at least one observation; and for successive actions to be performed by the robotic device in a second context: receiving sensory data associated with the robotic device in the second context at a time preceding a given action; mapping the task embedding and the sensory data to control instructions for the robotic device for the given action; and instructing the robotic device to perform the given action using the control instructions.

In certain examples, the at least one observation of a task comprises image data for at least two time steps, the at least two time steps covering a time period in which the task is performed in the first context, the image data being representative of at least one image showing the robotic device performing the task in the first context.

In certain examples, the sensory data associated with the robotic device comprises at least one of image data representative of at least one image showing the robotic device performing the task in the second context and state data for the robotic device, and wherein the control instructions comprise instructions for one or more actuators of the robotic device to enable movement of the robotic device in the second context.

In certain examples, the method includes, prior to receiving the at least one observation: loading respective parameters to configure a task embedding network and a control network, the task embedding network being used to generate the task embedding and the control network being used to map the task embedding and the sensory data to the control instructions for the robotic device, the parameters resulting from joint training of the task embedding network and the control network on training data comprising training samples of a plurality of training tasks, the training samples comprising one or more observations of the plurality of training tasks being performed and corresponding actions taken to perform the training task.

In certain examples, the method includes, prior to receiving the at least one observation, jointly training a task embedding network to perform the task embedding and a control network to apply a policy to perform the mapping from the task embedding and the sensory data to the control instructions for the robotic device. In these examples, jointly training the task embedding network and the control network may include, for a training iteration: sampling a set of training tasks from a set of training data; for each given task in the set of training tasks: determining a support set for the given task comprising a first set of observations of the robotic device performing the task; determining a query set for the given task comprising a second set of observations of the robotic device performing the task, the first and second set of observations being disjoint; using the task embedding network to compute a task embedding for the support set and a task embedding for the query set; initialising a loss function for the task embedding network and the control network; and for each given task in the set of training tasks: computing a loss function term for the task embedding network, the loss function term comprising a hinge loss function that compares a first similarity measure between a task embedding for the query set for the given task and a task embedding for the support set for the given task with a second similarity measure between the task embedding for the query set for the given task and a task embedding from a set of task embeddings for support sets for tasks that are not the given task. The training iteration may be repeated to optimise the loss function to determine parameter values for the task embedding network and the control network. Jointly training the task embedding network and the control network may include, for a training iteration: for each given task in the set of training tasks: computing at least one loss function term for the control network, the at least one loss function term comprising a comparison of predicted control instructions using the control network with control instructions for actions taken to perform the given task. The at least one loss function term for the control network may include a policy loss term for the support set for a given task and a policy loss term for the query set for the given task. In these examples, the task embedding may provide a representation of the task. Task embeddings for two tasks that have a shared set of characteristics may be closer in an embedding space than task embeddings for two tasks that have a differing set of characteristics. In these examples, the set of parameters for the task embedding network and the control network may be learnt in a simulated environment using a simulated robotic device.

According to a third aspect of the present invention there is provided a non-transitory computer-readable storage medium comprising computer-executable instructions which, when executed by a processor, cause a computing device to: obtain training data for a control system comprising at least a task embedding network, the task embedding network configured to map input data to a task embedding, the training data comprising observation-action data pairs for one or more tasks that are performed in one or more contexts by a controllable device; generate a support set and a query set for each of a set of training tasks represented within the training data, including to, for a given task in the set of training tasks: apply the task embedding network to a first set of observation-action pairs for the given task to generate a support set task embedding, and apply the task embedding network to a second set of observation-action pairs for the given task to generate a query set task embedding, the first and second set of observation-action pairs being disjoint; and optimise a loss function for the control system to determine values for trainable parameters for the control system, the loss function for the control system being a function of a loss function for the task embedding network, the loss function for the task embedding network being based on a comparison of similarity measures for the support set and the query set, wherein a similarity measure between the query set task embedding for a given task and the support set task embedding for the given task is compared to a similarity measure between the query set task embedding for the given task and a support set task embedding for a task that is not the given task.

In certain examples, the control system comprises a control network to apply a policy to map the input data and the task embedding from the task embedding network to action data for the controllable device; the loss function for the control system is a function of a loss function for the control network; and the loss function for the control network for a given task comprises a policy loss for the support set and a policy loss for the query set.

In certain examples, observation data within each of the observation-action data pairs comprises image data representative of at least one image featuring the controllable device that is captured prior to an action associated with the observation-action data pair, respectively, the observation data being captured during performance of a task.

In certain examples, the loss function for the task embedding network comprises a hinge loss function and the similarity measure comprises a dot-product similarity.

In certain examples, the instructions, when executed by a processor, cause the computing device to: receive observation data showing a task being performed by a robotic device in a first context; apply the task embedding network of the control system, after training, to the observation data to generate a task embedding; and iteratively map the task embedding and sensory data for the robotic device in the second context to a sequence of control actions for the robotic device, wherein the sensory data is updated and remapped following performance of a control action in the second context.

The non-transitory computer-readable storage medium may include computer-executable instructions which, when executed by the processor, cause the computing device to perform any of the methods described herein.

According to a fourth aspect of the present invention there is provided a control network for a robotic device, wherein the control network is configured to: receive a task embedding comprising a representation of a task generated from one or more demonstrations of the task; and apply a policy to map a plurality of successive observations of the robotic device to respective control instructions for the robotic device, wherein the policy applied by the control network is modulated across the plurality of successive observations of the robotic device using the task embedding.

In certain examples, the control instructions comprise motor control instructions and the control network is configured to control one or more motors of the robotic device using the motor control instructions.

Further features and advantages will become apparent from the following description, given by way of example only, which is made with reference to the accompanying drawings.

DETAILED DESCRIPTION

Certain examples described herein provide a control system that incorporates an embedding of a task to be performed (referred to herein as "task embedding") and a control system that generates device control instructions. These examples embed tasks, wherein tasks that are similar, e.g. in visual and/or control aspects, are arranged close together in embedding space, whereas tasks that are dissimilar are arranged at a distance from one another. This task embedding space may be multi-dimensional (e.g. having a dimensionality of 10-128). Using a task embedding allows for few-shot learning, while opening the possibility of inferring information from new and unfamiliar tasks in a zero-shot fashion, such as how similar a new task may be to a previously seen one.

Certain examples described herein comprise a task-embedding network and a control network that are jointly trained to output actions (e.g. motor velocities) to attempt to perform new variations of an unseen task, given one or more demonstrations. The task-embedding network may be configured to learn a compact representation of a task, which is used by the control network, along with continually received observations of an environment (e.g. a real or virtual world), to output actions in the form of device control instructions. These examples avoid a strict restriction on the number of tasks that can be learned, and do not easily forget previously-learned tasks during or after meta-training. In certain examples, the task embedding network may receive visual information from the demonstrator during test time. This may be in the form of frames of video of a robotic device performing the task. Using visual information makes the examples suitable for learning from human demonstrations.

Certain examples described herein provide the ability to learn visuomotor control in a one or few-shot manner, e.g. on visually-guided manipulation tasks. Certain examples achieve higher success rates when compared to comparative approaches.

Certain examples further enable a mixture of simulated and real-world data points, e.g. to enable training in a simulated environment to be used when performing tasks in the real world, providing a path for large-scale generalisation. This is desirable as it may be difficult to obtain the large number of training examples needed in end-to-end systems from real-world observations. Certain examples described herein enable a robot to learn new tasks from a single demonstration in the real-world, despite being trained to meta-learn in a simulated environment.

Certain examples described herein provide behavioural cloning in the context of learning motor control. Behavioural cloning may be seen as a form of imitation learning, in which the agent learns a mapping from observations to actions given demonstrations, in a supervised learning manner In certain cases, motor control instructions may be learned directly from pixels based on a learned embedding or metric space.

Figure 1:
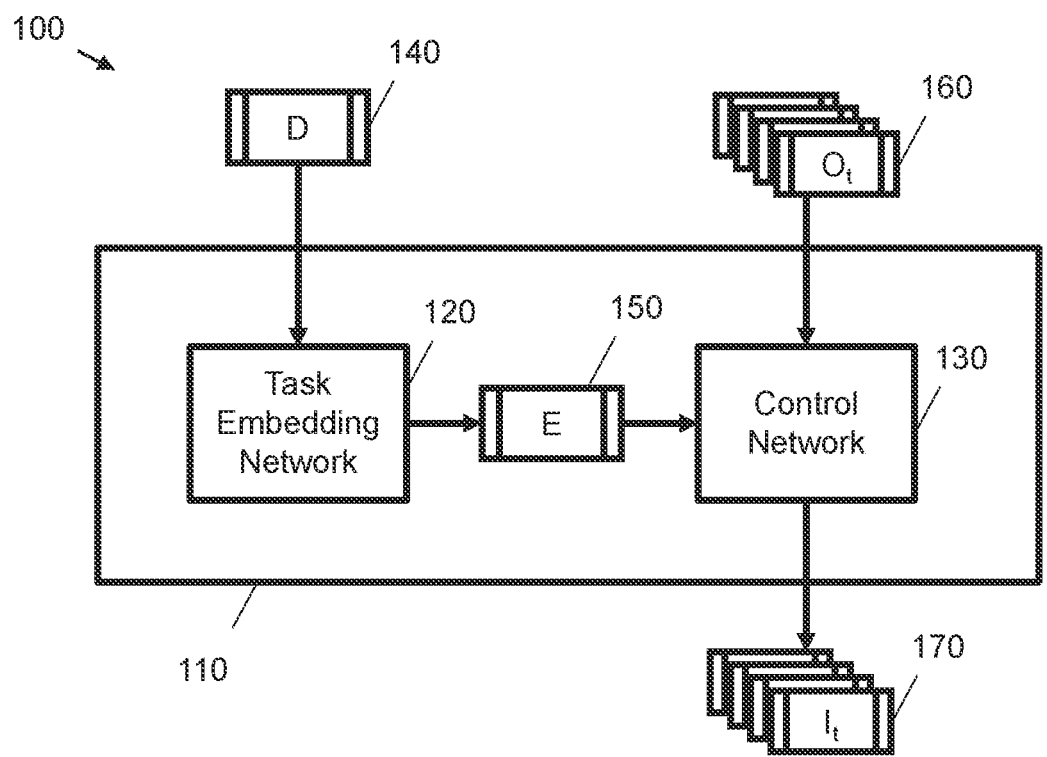
FIG. 1 is a schematic diagram showing a control system for a robotic device according to an example.

FIG. 1 show schematically an example 100 of a control system 110 for a robotic device according to an example. The control system 110 of FIG. 1 includes a task embedding network 120 and a control network 130. The task embedding network 120 receives a demonstration 140 of a task. The demonstration 140 of the task may include one or more observations of a performance of the task. In the example of FIG. 1, a single demonstration 140 is received. However, in other examples which may otherwise be similar to FIG. 1, a plurality of demonstrations of a task may be received by the task embedding network 120. A task is for example a deed or undertaking that is to be performed. For example, a task may be considered to be successfully completed when a particular aim or goal has been achieved. A task may therefore be defined as a set of actions to be performed to achieve a predefined aim or goal. For example, a task may comprise manipulating an available object in an environment in a particular manner, such as placing object X in receptacle Y, or moving object X to location Y. The set of actions, in the context of a robotic device, may comprise a set of movements and/or actuator activations that perform the task. The task embedding network 120 is configured to generate a task embedding 150 including a representation of the task, based on the one or more demonstrations 140.

The control network 130 of FIG. 1 receives the task embedding 150 from the task embedding network 120. In other examples, though, a control network similar to or otherwise the same as the control network 130 of FIG. 1 may instead receive the task embedding 150 from a different component than the task embedding network 120, such as from storage or from a further electronic device, such as a computer device or a server device, e.g. via a suitable network.

The control network 130 of FIG. 1 also receives a plurality of successive observations 160 of a robotic device and applies a policy to map the plurality of successive observations 160 of the robotic device to respective control instructions 170 for the robotic device. The policy applied by the control network 130 is modulated across the plurality of successive observations 160 of the robotic device using the task embedding 150 from the task embedding network 120. The control instructions 170 generated by the control network 130 may then be used to control the robotic device to perform the task. Modulation in this case may comprise applying the policy as a function that takes as input the task embedding 150 and each of the plurality of successive observations 160, wherein for a given observation an output may differ with different task embeddings. A further description of example control networks which may be used as the control network 130 of Figure is provided with reference to FIGS. 4, 5a and 5b.

Figure 2:
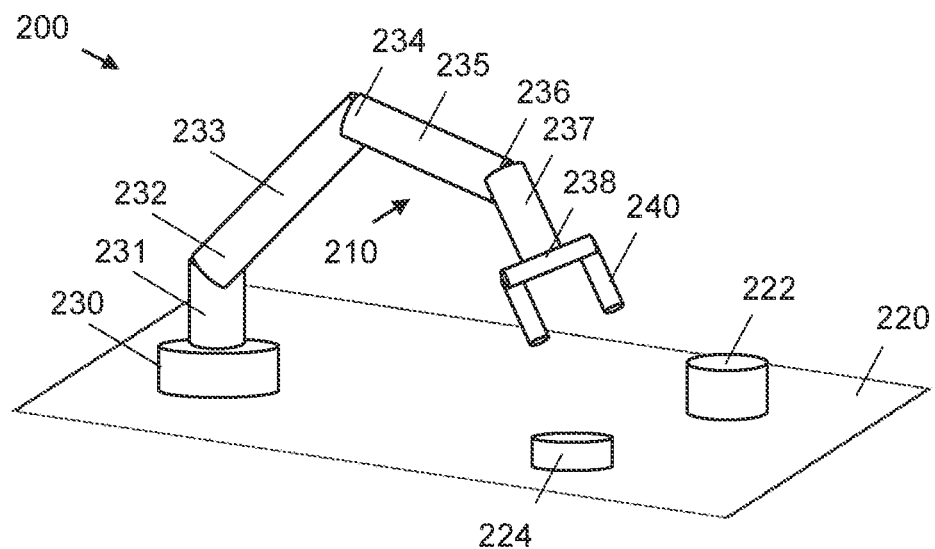
FIG. 2 is a schematic diagram showing a robotic device according to an example.

FIG. 2 shows schematically an example 200 of a robotic device 210. A robotic device is for example a machine capable of being controlled to perform a series of actions. A robotic device may be able to act autonomously, based on control instructions, so as to perform a particular set of movements or manoeuvres. Robotic devices (sometimes referred to as robots) may take various different forms. For example, a robot may be produced with a different shape or structure depending on the task the robot is intended to perform.

In the example of FIG. 2, the robotic device 210 is statically mounted within a three-dimensional (3D) space. In this case, a base 230 of the robotic device 210 is affixed to a surface 220. However, a portion of the robotic device 200 (in this case, an arm of the robotic device 200) is capable of moving with the 3D space and interacting with objects within the space. The base 230 may or may not allow rotation of the robotic device 210 on top of the surface 220. The arm of the robotic device 200 includes five elements 231, 233, 235, 237, 240 connected in an end-to-end fashion via four joints 232, 234, 236, 238. The joints 232, 234, 236, 238 may allow rotational movement, translational movement, both rotational movement or translational movement, or other types of movement of the elements 231, 233, 235, 237, 240 of the arm. The element 240 of the robotic arm that is furthest from the base 230 in this example is a robotic hand, which may be referred to as an end effector. The robotic hand 240 may be used to perform various different tasks, such as gripping, lifting or moving of objects etc. A type of end effector of a robotic device may depend on the tasks the robotic device is intended to perform, and may therefore differ from a robotic hand in other examples. For example, an end effector may be a vacuum nozzle or surface wiping end effector for a robotic device that is intended to perform cleaning tasks.

The example 3D space shown in FIG. 2 includes a first object 222 and a second object 224 supported by the surface 220. Here, "objects" may refer to any visible thing or entity with a material presence, e.g. that a robotic device may interact with. An "object" may correspond to collections of matter that a human being can label. Object here is considered broadly and includes, amongst many others, entities such as walls, doors, floors and people as well as furniture, other devices, and conventional objects in a home, office and/or exterior space. Although the 3D space in FIG. 2 is shown with the surface 220 this need not be the case in all implementations. For example, an environment may be aerial or within extra-terrestrial space.

It is to be appreciated that the robotic device 210 of FIG. 2 is merely an example and other examples are envisaged. For example, a robotic device may not be fixed in position. Such a robotic device may itself be moveable. In order to enable movement of a robotic device, such a device may include actuators to enable the robotic device to navigate a three-dimensional (3D) space. These actuators may include wheels, burrowing mechanisms, rotors, etc. For example, a robotic device may be or include an autonomous aerial and/or terrestrial mobile device. In other cases, a different portion of a robotic device than a base may be fixed relative to a surface or other object, and/or a robotic device may have a different structure or arrangement than that shown in FIG. 2.

FIGS. 3A, 3B, 3C and 3D are schematic diagrams illustrating different types of tasks that may be observed and/or performed in examples.

Figure 3A:
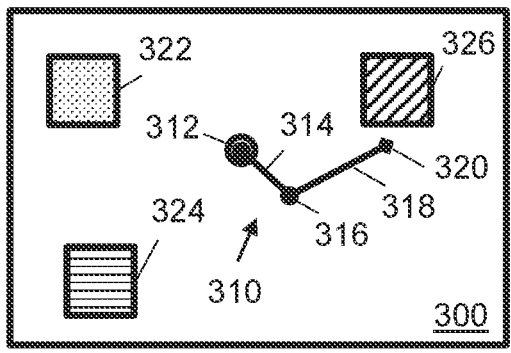
FIGS. 3A, 3B, 3C and 3D are schematic diagrams illustrating different types of tasks that may be observed and/or performed in examples.
Figure 3B:
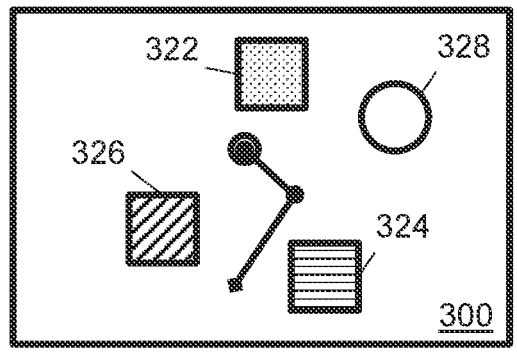

FIGS. 3A and 3B each provide an example of a reaching task. The reaching task of FIGS. 3A and 3B involves a robotic device 310 reaching for a third object 326. The robotic device 310 in this example is a robotic arm, which is similar to the robotic device 210 of FIG. 2. However, the robotic device 310 of FIGS. 3A and 3B includes a base 312, two elements 314, 318 connected via a joint 316, and a robotic hand 320, and therefore includes fewer components than the robotic device 210 of FIG. 2. Note, labelling of the components of the robotic device 310 are omitted in FIG. 3B, for clarity.

The third object 326 in this example is an object of a particular colour (shown schematically via a diagonal line pattern within the third object 326 in FIGS. 3A and 3B). The third object 326 is supported by a surface 300, to which the base 312 of the robotic device 310 is affixed. A first object 322 and a second object 324 are also on the surface 300 in FIGS. 3A and 3B. FIG. 3B additionally includes a fourth object 328 on the surface 300. The first, second and fourth objects 322, 324, 328 are of different colours than the third object 326. This is indicated in FIGS. 3A and 3B by the dotted pattern within the first object 322, the horizontal line pattern within the second object 324 and the absence of a pattern within the fourth object 328.

In this example, the task may therefore to be considered to correspond to reaching for an object of a particular colour (in this case, the third object 326). In this case, the reaching task is performed in the presence of objects of other colours (the first and second objects 322, 324 in FIG. 3A and the first, second and fourth objects 322, 324, 328), which may be considered distractions, as they may distract the robotic device 310 from reaching the correct object.

The arrangement of the first, second and third objects 322, 324, 326 is different in FIGS. 3A and 3B, and FIG. 3B also includes a fourth object 328. However, each of FIGS. 3A and 3B show the robotic device 310 reaching towards the third object 326 rather than any of the other objects. Hence, each of FIGS. 3A and 3B may be considered to correspond to respective observations of the same task, despite the different arrangement. For example, FIGS. 3A and 3B may be considered to correspond to an observation of the same task in different contexts or different environments, due to the different position of the various objects in each of these examples.

A demonstration of a task for example includes one or more observations, such as the observations shown in FIGS. 3A and 3B. An observation for example corresponds to a record or other data that captures a performance of the task. In certain cases, an observation may comprise an image (e.g. a video frame) from a capture device located in the environment of the entity performing the task. In some cases, though, the observation may be a virtual observation of a simulated task, which nevertheless captures a simulated performance of the task. A virtual observation may comprise a rendered image of a simulated 3D environment that is captured from a predefined camera pose or configuration. A virtual observation may also, or alternatively, comprise position and/or orientation data for one or more elements and joints or a simulated robotic device. In a demonstration, the task may be performed by any suitable entity, such as a human being or other animal, or by an inanimate or manmade object or device such as a robotic device (e.g. the robotic device 310 of FIGS. 3A and 3B), or by a simulation of any such entity. The entity that demonstrates a task may differ from the entity that is to perform the task. Typically, the observation includes an observation of the entity performing the task. For example, in FIGS. 3A and 3B, the observation (which in this example is an image), includes the robotic device 310. The observation generally also includes data relating to other entities or objects involved in the performance of the task, such as an object which is to be manipulated as part of the task. For example, in FIGS. 3A and 3B, the observation includes the third object 326, which is the object to be reached in order to perform the task. The observation may also include data representative of other entities or objects that do not form part of the task itself but which may nevertheless be present at the time the demonstration of the task is performed. Such objects may include objects in a background of an environment in which the task is demonstrated, which are not manipulated during performance of the task. For example, the observations of FIGS. 3A and 3B each include the surface 300 and the other objects (the first and second objects 322, 324 in FIG. 3A and the first, second and fourth objects 322, 324, 328 in FIG. 3B).

An observation may be in any suitable format which is compatible with the task embedding network 120, such that the task embedding network 120 can generate a task embedding representative of the task based on the observation. For example, an observation of the task may include image data representative of at least one image of an entity performing the task. The at least one image may be a two-dimensional image of the entity, which may be in any suitable format. For example, the image data may include the intensity values of each pixel of the image, which may be stored with a greyscale or brightness level of, for example, from 0 to 255 per colour band or colour channel (for 8-bit data). When an image is a colour image, a pixel value of an intensity or brightness or each pixel may be stored separately for each colour channel If a pixel is represented by, for example, three primary colours such as in the RGB (red, green, blue) or YUV colour spaces (where Y represents the luma of the colour, U represents the difference between the blue component of the colour and the luma and V represents the difference between the red component of the colour and the luma), the visual appearance of each pixel may be represented by three intensity values, one for each primary colour. In such cases, the image data may include a series of images each capturing the entity at different respective times during the performance of the task (or shortly before or after performance of the task). For example, the image data may include data representative of a first image of the entity before the entity has started to perform the task. The image data in such cases may also include data representative of a second image of the entity after performance of the task. By comparing the two images, the task demonstrated by the entity can be determined. In other cases, the image data may include an image of an outcome of the task. For example, with respect to FIGS. 3A and 3B, the observations may be in the form of an image of the scenes set out in FIGS. 3A and 3B. FIGS. 3A and 3B show the position of the robotic device 310 during performance of the task, with the robotic device 310 reaching towards the third object 326.

In other examples, the image data may be derived from video data. Video data may be considered to include image data that varies with time. In such cases, the image data may include a plurality of frames of a video. Each frame may relate to a particular time t in a time period over which images of a 3D space are captured. A frame generally consists of a 2D representation of measured data. For example, a frame may comprise a 2D array or matrix of recorded pixel values at time t, and may therefore be equivalent to a still image recorded at time t.

Figure 3C:
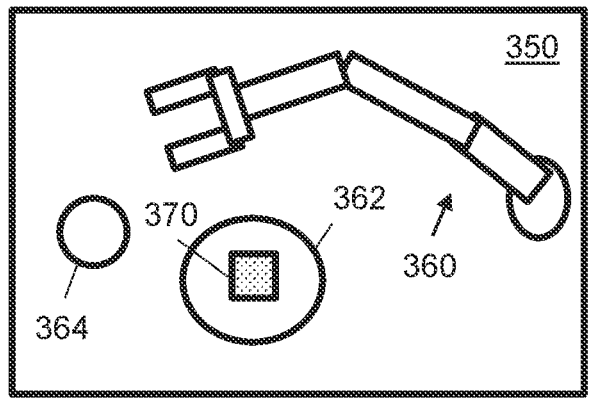
Figure 3D:
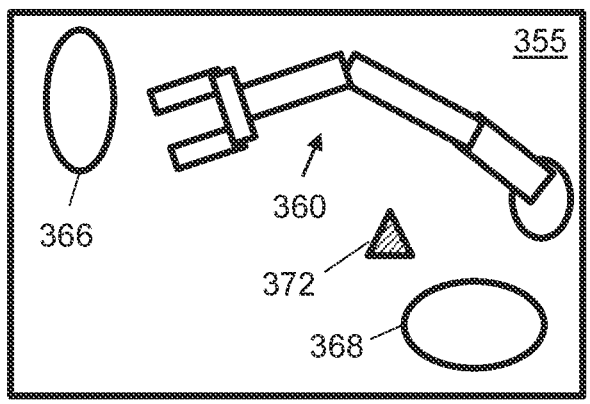

In yet further examples, the image data may include depth data in addition to photometric data, which is e.g. representative of colour or intensity values. The depth data may include an indication of a distance from a capture device used to obtain the depth data, e.g. each pixel or image element value may represent a distance of a portion of the 3D space from the capture device. FIGS. 3C and 3D show images 350 and 355 of a robotic device 360. These images may comprise frames of video data. In one case, the robotic device 360 may comprise the robotic device 210 shown in FIG. 2. In another case, the robotic device 360 may comprise a simulated version of the robotic device 210, e.g. that operates within a virtual environment. In this latter case, the images 350 and 355 may comprise a rendered image from the virtual environment. Image 350 of FIG. 3C shows an environment or context where the robotic device 360 is co-located with two receptacles 362 and 364. Image 350 shows the environment following completion of a task. The task in this case is to place an object 370 in receptacle 362. Image 355 of FIG. 3D shows the robotic device 360 before a task is to be performed. In this case, image 355 shows an environment or context with two differently shaped receptacles 366 and 368 and a differently shaped object 372. In certain configurations, image 355 may be taken to show a different task from image 350 (e.g. as the object 372 is different from the object 370). The environments of images 350 and 355 may also be said to differ. In other configurations, images 350 and 355 may be said to show a common task (e.g. placing an object in a receptacle) in two different environments or contexts. The configuration that is chosen for a particular implementation influences how data is arranged during training, demonstration and test time.

Figure 4:
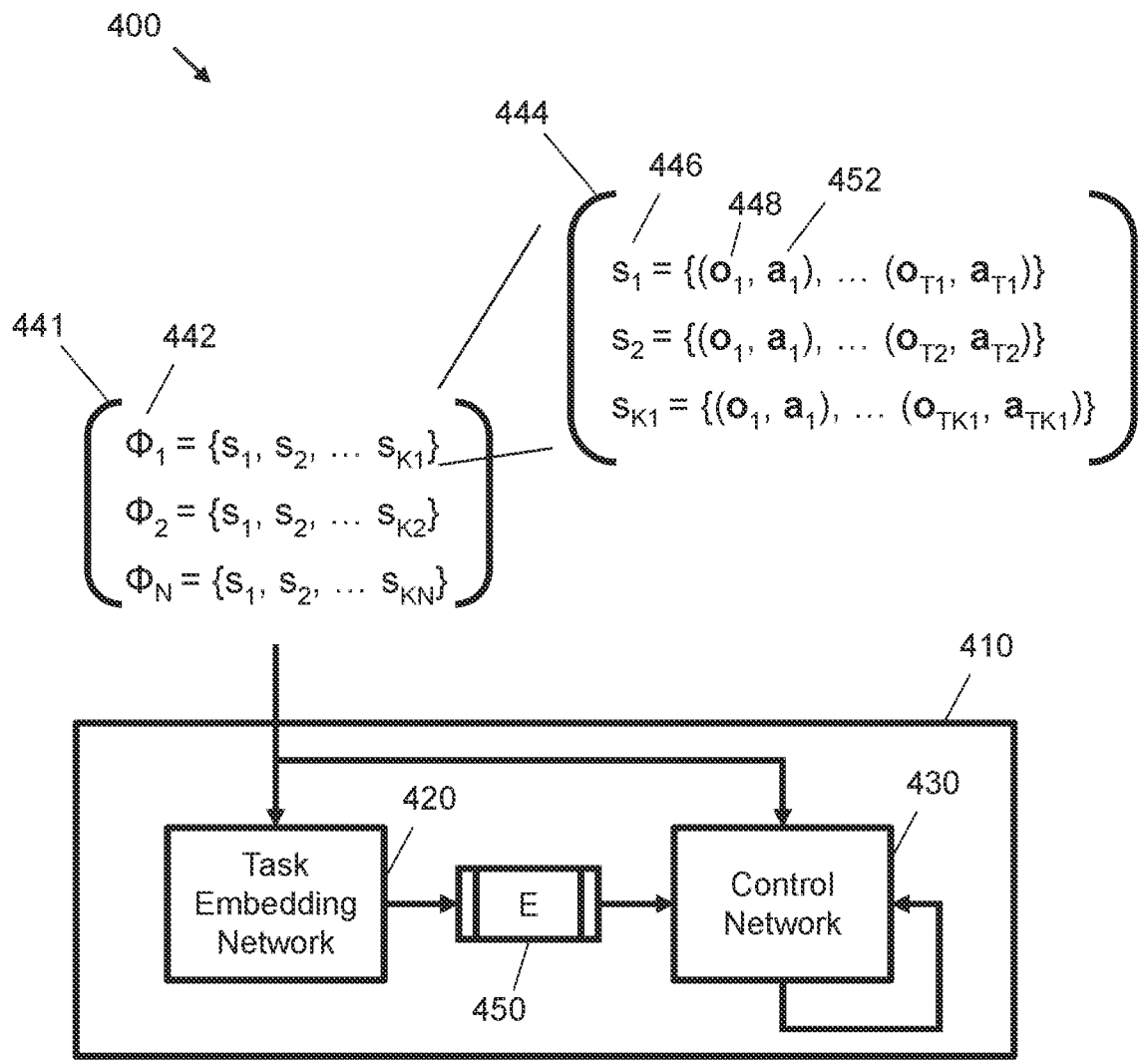
FIG. 4 is a schematic diagram showing the training of a control system according to an example.

FIG. 4 is a schematic diagram showing an example 400 of the training of a control system 410. The control system 410 of FIG. 4 is similar to the control system 110 of FIG. 1. Elements of FIG. 4 which are similar to corresponding elements of FIG. 1 are labelled with the same reference numerals incremented by 300; corresponding descriptions are to be taken to apply.

FIG. 4 illustrates an example in which the task embedding network 420 and the control network 430 are jointly trained on a training set 441 including training samples of at least one training task in at least one environment. In FIG. 4, the training set 441 includes N training tasks ($\Phi_1 \ldots \Phi_N$)—each task shown as 442 in FIG. 4. Jointly training the task embedding network 420 and the control network 430 allows task embeddings that are more meaningful to the control network 430 to be obtained, which in turn may improve the ability of the control network 430 to output control instructions to control the robotic device to successfully perform a given task.

In FIG. 4, there are a plurality of training samples for the N training tasks. There may be a different number of training samples s for each training task $\Phi$. In FIG. 4, the first task $\Phi_1$ has $K_1$ training samples, the second task $\Phi_2$ has $K_2$ training samples and the Nth training task $\Phi_N$ includes a series of $K_N$ samples ($s_1 \ldots s_{KN}$). Each training sample $s_x$ may be considered to be a trajectory, which represent a series of observation-action pairs over a series of time steps, from t=1 to t=$T_x$, during performance of a task. Each sample may therefore be represented mathematically as:

$$s_x = \{(o_1, a_1), \ldots, (o_{Tx}, a_{Tx})\}$$

where s represents a trajectory, o represents an observation, and a represents an action. Each sample may have a different number of time steps. The training set 441 may comprise a tuple comprising data representing observations and data representing corresponding actions. In such cases, the observations and actions may be represented numerically, for example using at least one vector, tensor or other multidimensional array.

In FIG. 4, a first training task 442, $\Phi_1$, is associated with a first series of samples 444. A first sample 446, $S_1$, of the first series of samples 444 includes observation-action pairs including an observation 448, $o_1$, and an action 452, $a_1$, at a first time (t=1). The first sample 446 further includes additional observation-action pairs at other times (from t=2, to t=$T_1$). An observation may comprise numeric data derived from an image, e.g. as described with reference to FIGS. 3A to 3D. An action may comprise numeric data derived from motor commands for a robotic device, such as desired or effected motor kinematic data. In certain cases, an observation may comprise robotic device state data, such as motor angles and/or positions at a time when an image of the robotic device is captured. Robotic device state data may not be used to train the task embedding network 420 but may be included to train the control network 430.

In this way, each training sample may comprise one or more observations of a given training task in a given environment and corresponding actions performed by a robotic device in the given environment. Each training sample therefore provides an opportunity for the control system 410 to learn the actions performed by the robotic device in response to given observations of a particular task. This allows the control system to learn a policy for a given task. This policy for example depends on the task embedding obtained by the task embedding network 420 so as to provide a task-specific policy. The control system 410 may be trained so that the policy for a given task emulates or closely matches or conforms to a so-called "expert" policy for that task. An expert policy is for example an ideal policy, in which the input of an observation (or series of observations) of a desired task results in the generation of control instructions to instruct the robotic device to perform the desired task. However, the policy learned by the control system 410 may differ to some extent from the expert policy in that, in some cases, the control instructions output by the control system 410 may control the robotic device to perform a different task from that intended (and that demonstration in the observation or observations). In general, though, the training of the control system 410 is intended to minimise differences between the learned policy and the expert policy. In practice, data representing an output of expect policy may be taken as the action data from the training samples, e.g. these actions represent the "expert" actions.

The observations used in training the control system 410 may be similar to those described with reference to FIGS. 3A and 3B. Hence, the observations may be observations of a performance of a task by a real-world robotic device in a real environment. Alternatively, the training samples may include at least one training task in at least one simulated environment. In such cases, each training sample may include one or more observations of a given training task in a given simulated environment and corresponding actions performed by a simulation of the robotic device in the given simulated environment. This may improve the scalability of the training process, as it may be easier or quicker to generate simulated training samples rather than generating training samples by manually controlling a robotic device to perform a given task. The training samples may be generated based on data captured during performance of a task by a human being, or under deterministic control. For example, training samples may represent a recording of a human being completing a defined task by controlling a robotic device and/or may represent a recording of a robotic device performing an explicitly programmed task. The training samples may then comprise a mixture of recordings of different tasks being performed.

Figure 8:
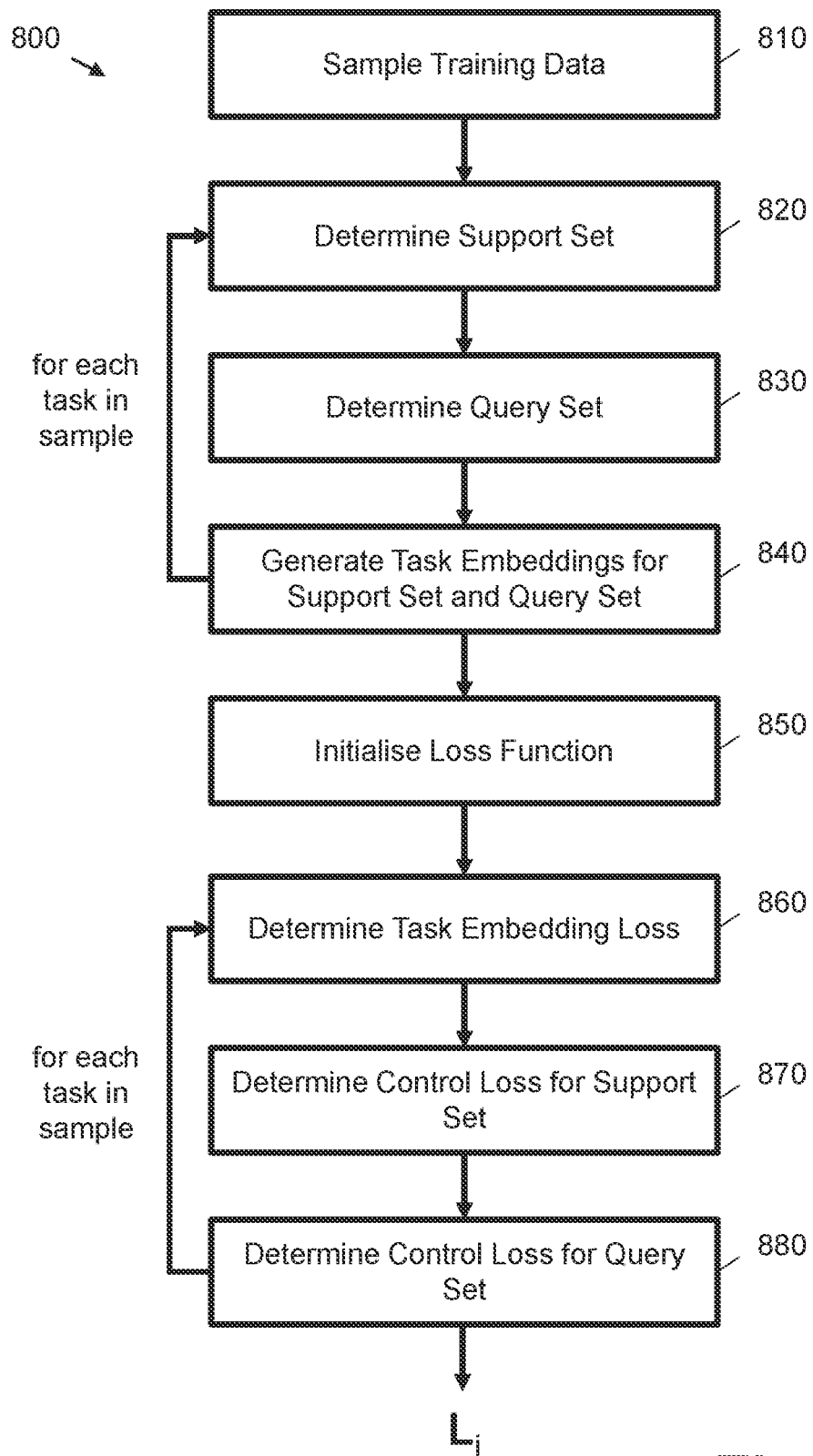
FIG. 8 is a flow diagram showing a method for training a control system according to an example.

An example of training a control system such as the control system 410 of FIG. 4 is described further with reference to FIG. 8.

Figure 5A:
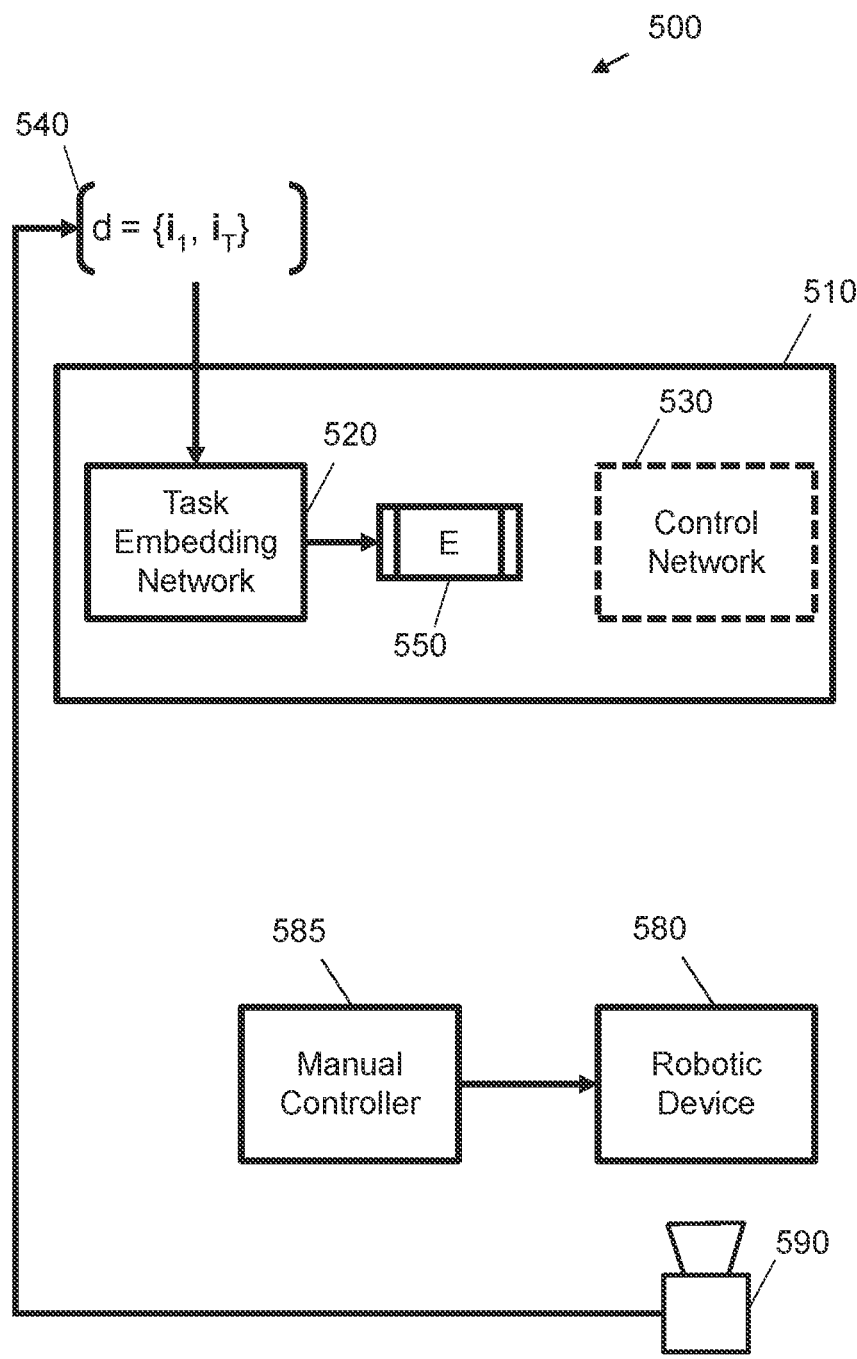
FIG. 5A is a schematic diagram showing generation of a task embedding according to an example.

FIG. 5A is a schematic diagram showing an example 500 of generation of a task embedding 550. The task embedding 550 in FIG. 5A is generated by a control system 510 including a task embedding network 520 and a control network 530. The control system 510 of FIG. 5A may be similar to the control systems 110, 410 of FIGS. 1 and 4, for example. However, in other examples, a task embedding similar to the task embedding 550 of FIG. 5A may be generated by a task embedding network such as the task embedding network 520, which forms part of control system that differs from the control network 530 of FIG. 5A or that is a separate system.

The task embedding network 520 receives a demonstration 540 (d) of a task as an input. The demonstration 540 in FIG. 5A is obtained by controlling a robotic device 580 to perform the task using a manual controller 585. The manual controller 585 may comprise a virtual and/or augmented reality controller. However, in other examples, the demonstration may be obtained differently. For example, the demonstration may be a virtual demonstration of a simulation of a robotic device performing the task. In other cases, the robotic device 580 may be controlled to perform the task using an electronic control system, for example using a predefined set of control instructions, rather than using the manual controller 585.

A performance of the task by the robotic device 580 is captured by a capture device 590, which in this example is a video camera. The video camera obtains a series of frames of the robotic device 580 during performance of the task. From this, the demonstration 540 of the task may be obtained, as described with reference to FIGS. 3A and 3B. In the example of FIG. 5A, the demonstration 540 includes at least a first and last observation from T observations of the robotic device 540 (shown in the Figure as images $\{i_1, i_T\}$). In certain cases, performance of a task may be continually captured at a series of time steps from t=1 to t=T and/or still frames may be captured at times t=1 and t=T. In both cases, two frames representing times "before" and "after" the performance of the task may be provided. In certain cases, a plurality of observations, e.g. all frames from t=1 to t=T, may be provided. Each observation may correspond to a frame of the video captured by the capture device 590. In other examples, though, the demonstration 540 may include a single observation of the robotic device 540 performing the task and/or comprise data in addition to frames of video data from the capture device 590 (e.g. including motor and/or object position data).

The demonstration 540 is processed by the task embedding network 520 to generate the task embedding 550. The task embedding network 520 maps the demonstration 540 to a representation of the task, as described further with reference to FIG. 6.

Figure 5B:
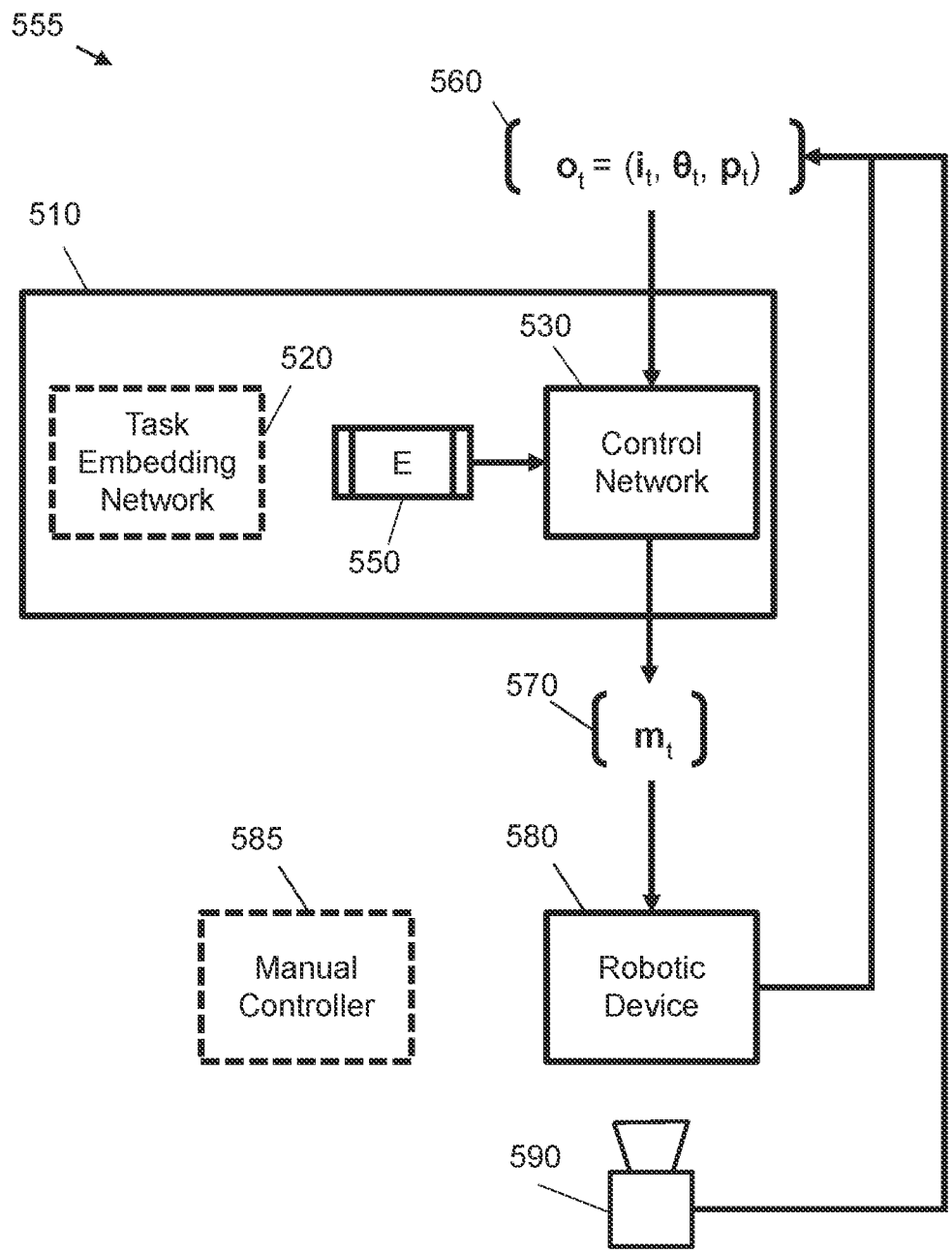
FIG. 5B is a schematic diagram showing control of a robotic device using the task embedding generated in the example of FIG. 5A.

In FIG. 5A certain components such as the control network 530 are not used. FIG. 5A may represent a "demonstration" phase of operation, wherein FIG. 4 represents a "training" phase of operation and FIG. 5B represents a "test" or "performance" phase of operation. As the control network 530 is not used in the "demonstration" phase, in certain cases, the control network 530 may not be present for this phase. For example, only the task embedding network 520 need be provided and/or the task embedding network 520 may be implemented by a computing device that is located remotely to the control network 530. For example, the "demonstration" phase may take place remotely from the "test" phase, enabling a form of telepresence.

FIG. 5B is a schematic diagram showing an example 555 of control of a robotic device 590 using the task embedding 550 generated in the example 500 of FIG. 5A. In the example of FIGS. 5A and 5B, the task embedding 550 is sent from the task embedding network 520 to the control network 530. However, in other examples, the task embedding 550 generated by the task embedding network 520 may be stored in storage, and subsequently retrieved from the storage by the control network 530, or otherwise received by the control network 530. The storage may be local storage of the control network 530 or storage that is external to the control network 530.

The control network 530 receives a plurality of successive observations 560, $o_t$, of the robotic device 580 over a series of time steps t. The observations 560 show the robotic device 580 within a current environment surrounding the robotic device 580, which may differ from the environment of the robotic device 580 during the demonstrations 540 of the task. The observations in FIG. 5B comprise image data $i_t$ from the capture device 590, angle data $\theta_t$ from the robotic device 580 and position data $p_t$ from the robotic device 580. The angle data $\theta_t$ for example represents a respective angle of at least one joint of the robotic device, which may be an absolute angle taken with respect to a fixed or common reference plane, such as a horizontal plane, or a relative angle taken between two adjoining elements of the robotic device. The position data $p_t$ may represent a position of an end-effector or other element of the robotic device. The position may be measured using a reference coordinate system, such that the position may be represented using coordinates within the reference coordinate system. In other examples, the position may be relative position of a given element of the robotic device with respect to a different element of the robotic device, such as a position of the end-effector of the robotic device relative to a base of the robotic device. By including the angle data $\theta_t$ and position data $p_t$, the control system may more accurately control the robotic device to perform the observed task. However, in some cases, the angle data $\theta_t$ and/or the position data $p_t$ may be omitted from the observations of the robotic device. Each data item may comprise a tensor, e.g. a vector representation of the data. Each observation 560 received by the control network 530 in FIG. 5B may thus comprise a fusion of the image, angle and position data (e.g. a concatenated vector or multi-dimensional array), or the observation may include separate image, angle and position data, which may be fused subsequently by the control network 530. In other examples, the control network 530 may just receive image data $i_t$ from the capture device.

The control network 530 applies a policy to map the observations 560 of the robotic device 590 using the task embedding 550. This may be referred to as a "test" procedure, in contrast to the "training" procedure explained with reference to FIGS. 4 and 8. This process may be expressed in pseudo-code as:

procedure TEST(E, Env)
  while task not complete do
  o=Env. GetObservation( )
  a=π(o, E)
  Env.Step(a)

where E represents the task embedding 550 generated by the task embedding network 520 as described with reference to FIG. 5A, Env represents the environment surrounding the robotic device 580, o represents an observation 560 of the robotic device 580 and π represents the policy applied by the control network 530 to map the observation o to an action a to be performed by the robotic device 580. The policy applied by the control network 530 may be represented by a neural network, such as a convolutional neural network (CNN). For example, the image data $i_t$ of a given observation 560 may be processed by convolutional layers of a CNN to extract image features, which may be represented as a tensor, e.g. as a vector or a multi-dimensional array. For example, the convolutional layers of the CNN may output an image feature vector. Where the observation data representative of the observation 560 includes angle data and position data in addition to the image data, the angle data and the position data may be the form of an angle vector and a position vector, respectively. In such cases, the image, angle and position data may be fused by concatenating the image feature vector, the angle vector and the position vector, to obtain a concatenated vector. The concatenated vector may then be processed by a remaining portion of the CNN, such as at least one fully connected layer of the CNN, in order to implement the policy. In other examples in which the observation data lacks angle data and/or position data, the image feature vector itself may be processed by the remaining portion of the CNN to implement the policy.

In such cases, the task embedding 550 may be combined, fused or otherwise processed with the observation 560 to generate an action a to be performed by the robotic device 580 in accordance with the policy π. For example, a task embedding 550 in the form of a task embedding vector may be concatenated with the observation 560 (which may also be in the form of a vector) before being processed by the control network 530. For example, a concatenated vector may be generated by concatenating a task embedding vector representative of a task embedding 550 with an image feature vector obtained by processing the image data using convolutional layers of a CNN. The concatenated vector may then be processed by a remainder of the CNN, such as at least one fully connected layer of the CNN, to generate the action a to be performed by the robotic device 580. As described above, in some cases, the task embedding vector and the image feature vector may also be concatenated with an angle vector and/or position vector (if part of the observation 560) to generate the concatenated vector, before the concatenated vector is processed by the remainder of the CNN.

This procedure may be performed iteratively, for a series of observations 560 of the robotic device 580, to generate a series of actions to be performed by the robotic device 580 to implement the task. For each iteration, though, the task to be performed by the robotic device 580 remains the same (e.g. the given task embedding 550 is constant), although the observations will generally change of time (e.g. as the robotic device 580 moves to perform the task).

The control network 530 of FIG. 5B generates the actions a to be performed by the robotic device 580 as a series of control instructions. In this example, the control instructions comprise motor control instructions 570 (shown in FIG. 5B as $m_t$, to represent a series of motor control instructions 570 over successive time steps t). The motor control instructions 570 are used to control the robotic device 580 to perform a sequence of motor actions. For example, the motor control instructions 570 may instruct the robotic device 580 to adopt particular arm joint angles, end-effector positions, joint velocities, pose measurements, positions and the like, e.g. by controlling one or more motors of the robotic device 580. In this way, the robotic device 580 may be controlled to perform the task by the control network 530, without requiring human input via the manual controller 585.

In the example of FIGS. 5A and 5B, at least one of the task embedding network 520 and the control network 530 may be trained on a training set comprising training samples of at least one training task, which includes a first task. However, the task received by the task embedding network 520 to generate the task embedding 550 may be a second task, which is different from the first task. In other words, the task embedding network 520 may be trained on tasks that differ from those used at test time. For example, the first task may be the task of reaching for a red object and the second task may be the task of reaching for a blue object. Nevertheless, by using the task embedding network 520, the control system 510 may be able to appropriately map the second task to a task embedding 550 that captures how the second task differs from the first task. This may, in turn, allow the control network 530 to more accurately determine control instructions to perform the second task, rather than the first task. In this way, the control system 510 is for example better able to learn or otherwise adapt to new tasks, without retraining the task embedding network 520 and/or the control network 530. Hence, the robotic device 580 may learn a new task from one or more demonstrations of the new task in an efficient manner.

In some cases, the demonstrations 540 of the task used to obtain the task embedding 550 may include observations of a performance of the task in a first environment. However, it may be desired to perform the task in a second environment, and so the plurality of observations 560 of the robotic device 580 may include observations of a performance of the task in the second environment. The first and second environments may have at least different configurations from each other. For example, the same objects may be present in the first and second environments. However, the relative position of the objects in the first and second environments may differ from each other. In other cases, though, the first and second environments may correspond to different locations. For example, the first environment may be an indoor environment and the second environment may be outside. Nevertheless, despite differences between the first and second environments, the control system 510 in examples is able to generate control instructions for the robotic device 580 to perform the task in the second environment, based on the observations 560 of the robotic device 580 in the second environment. For example, the task embedding network 520 allows a representation of the task to be obtained, which is for example relatively invariant to changes in environment. The robustness of the task embedding 550 obtained by the task embedding network 520 therefore improves the ability of the control network 530 to accurately predict an appropriate action for a given demonstration of a task, even if the observed environment of a robotic device for performing the task differs from an environment in which the task is demonstrated.

Figure 6:
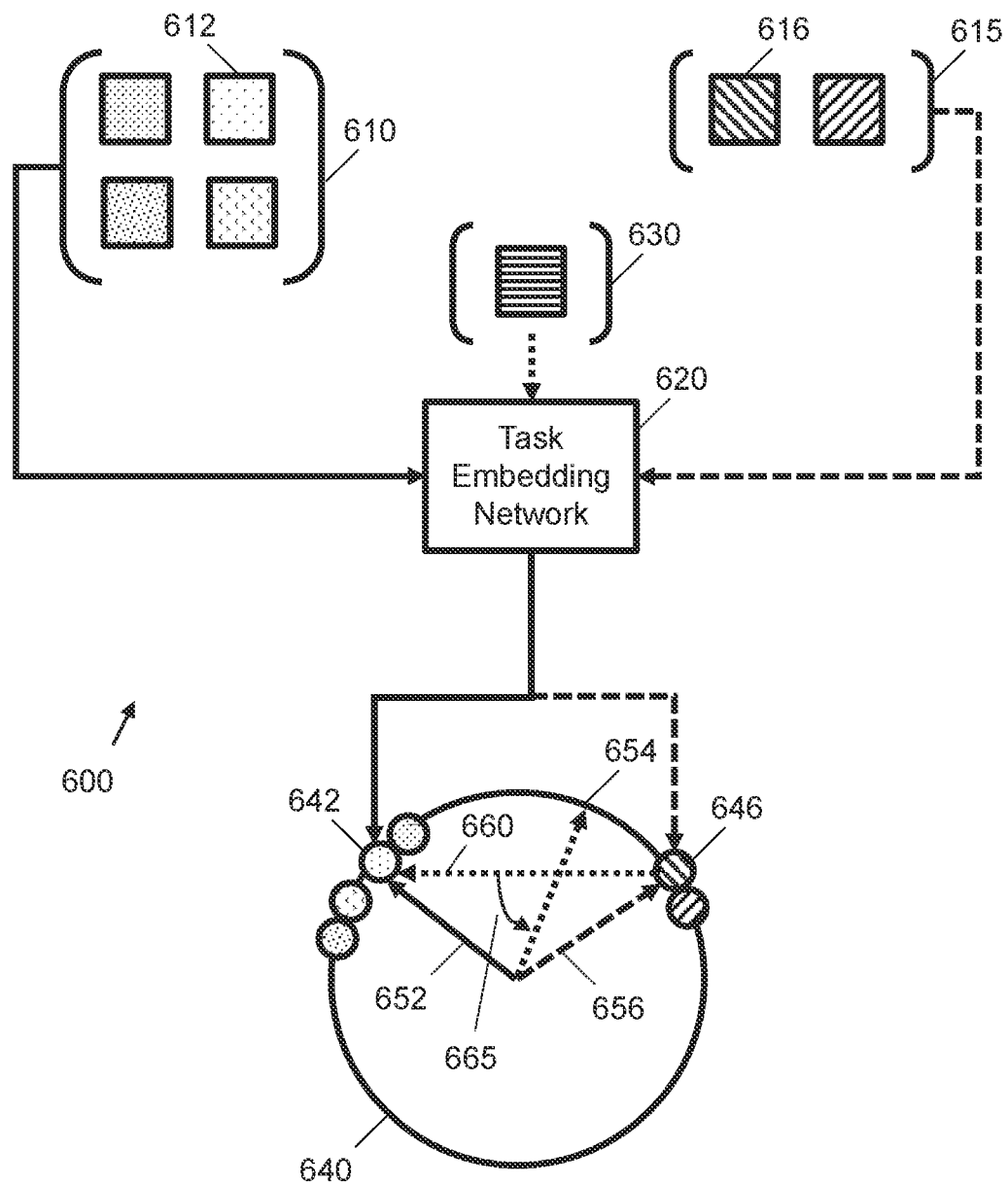
FIG. 6 is a schematic diagram illustrating the operation of a task embedding network according to an example.

FIG. 6 is a schematic diagram illustrating an example 600 of the operation of a task embedding network 620. The task embedding network 620 receives samples 610 of a first task and samples 615 of a second task. Each set of samples may be considered to be a "support set" for a particular task. The samples 610 of the first task include four observations of the first task, one of which is labelled in the Figure with the reference numeral 612. The samples 615 of the second task include two observations of the second task, one of which is labelled in the Figure with the reference numeral 616.

Training the task embedding network 620 for example involves using each of the samples 610, 615 as training samples. The task embedding network 620 embeds or otherwise maps the samples 610, 615 to a representation of the respective task, which may be a compact representation of the task. Such a representation may be referred to as a sentence. A representation of a task may be a latent representation. A latent representation is for example an inferred representation based on the observations of the task, which is for example inferred by the task embedding network 620. A task may be represented numerically, typically using a multi-dimensional numerical representation such as a tensor or a vector. A task embedding may be more meaningful than the samples 610, 615 themselves, as the position of a task in the embedding space may provide information on the type of that task (e.g. whether it is a pushing task, a lifting task, etc.). In contrast, pixel values of an observation of a demonstration may provide limited information regarding the type of task being performed in that observation, and whether it is similar to or different from a different observation of a task.

FIG. 6 shows the embedding of each of the samples 610, 615 in a simplified embedding space 640. As can be seen, the samples 610 of the first task are relatively close together in the embedding space 640 and are closer to each other than the samples 615 of the second task in the embedding space 640. The embeddings generated by the embedding network 620 for a given task may be aggregated using an aggregate function, which may be an average or mean function. In this way, a first embedding 642 representative of the first task and a second embedding 646 representative of the second task may be obtained.

Subsequently, a further sample 630 of a task may be processed using the task embedding network 620. The further sample 630 may be considered to be a "query set". A loss function may be calculated to learn an ideal or optimal embedding for the task embedding network 620. As described further with reference to FIG. 8, the loss function may be a task embedding loss, involving the comparison of examples of a particular task with examples of different tasks, so that the task embedding network 620 learns to map different asks to different regions of the embedding space 640.

For example, during training, the loss function term may compare the task embedding 654 of the task corresponding to the further sample 630 (the query set) may be compared with the first embedding 642 and the second embedding 646 (e.g. task embeddings for each of the support sets). For example, a hinge loss function with a configurable margin may be used. Such a loss function may be used to teach the task embedding network 620 to map samples of the first task towards the first embedding 642 representative of the first task and to move the second embedding 646 representative of the second task away from the samples of the first task.

In this way, the task embedding network 620 may be used to generated task embeddings such that task embeddings for two tasks that have a shared set of characteristics are closer in the embedding space 640 than task embeddings for two tasks that have a differing set of characteristics. For example, in FIG. 6, the further task 630 is deemed to be closer to the second sample set 615 than the first sample set 610. This allows a similarity between tasks to be identified based on their distance in the embedding space 640. Furthermore, unseen tasks can be mapped to an appropriate position in the embedding space 640, which may be representative of their similarity to other tasks that the task embedding network 620 has been trained on. By mapping tasks in this way, a control network may be able to more easily identify an appropriate set of control instructions to instruct a robotic device to perform unseen tasks, without retraining the task embedding network 620 or the control network. In FIG. 6, arrows 652, 654 and 656 may represent the act of mapping a sample to the embedding space. a hinge rank loss may drive a dot product of the further sample 630 such that a difference between the two other task sets (represented by line 660) is at least as large as a margin (represented by angle 665). Training of the task embedding network may act to move an aggregate task embedding for a support set for a given task to be closer to a query set for the given task and also act to move aggregate task embeddings for different tasks (so-called "negative sentences") further away from the query set for the given task.

Figure 7:
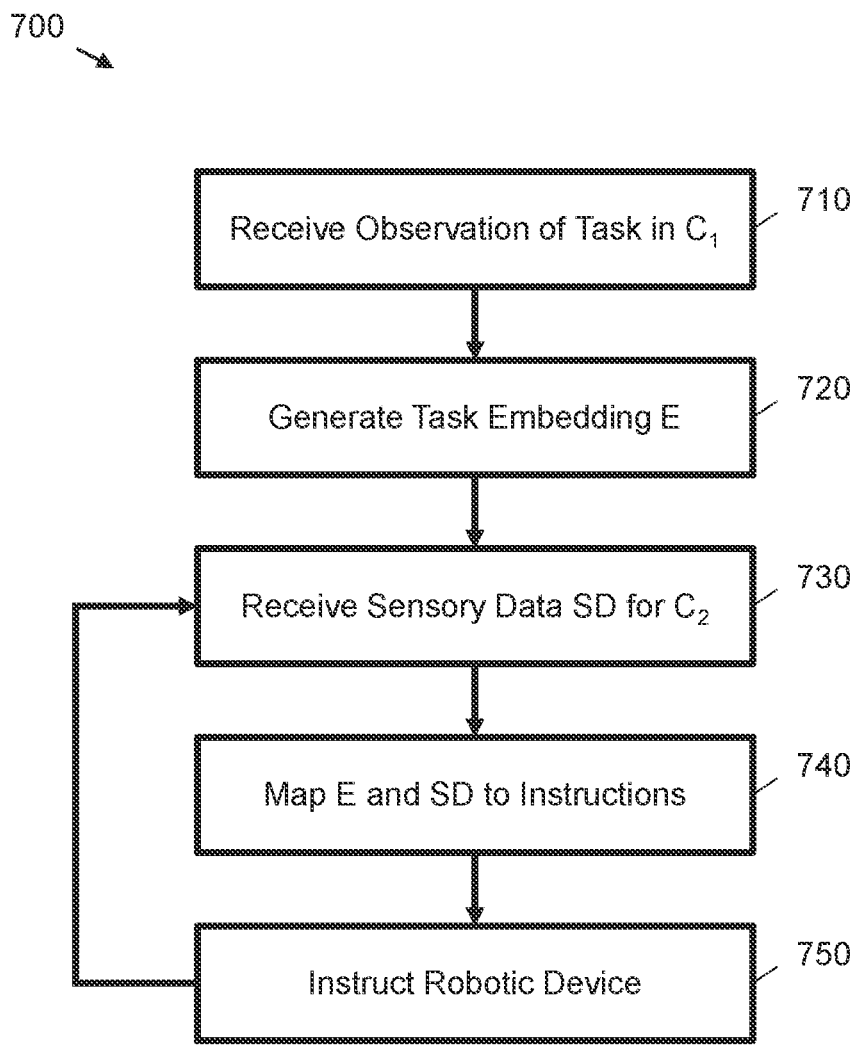
FIG. 7 is a flow diagram showing a method for controlling a robotic device according to an example.

FIG. 7 shows a method 700 of controlling a robotic device according to an example. The robotic device may comprise any real or simulated device capable of performing actions in respective real or simulated environments. For example, the robotic device may comprise a robotic device as shown in any of the previous Figures.

At block 710, at least one observation of a task being performed in a first context is received. As discussed previously, a task may be defined as a set of actions to be performed to achieve a predefined aim or goal. The term "context" refers to an environmental configuration for the task. For example, a first context may relate to a first environmental configuration comprising a particular set of objects arranged in a particular space. An observation of a task may comprise sensory data across one or more time periods in which actions associated with the task are performed. For example, an observation may comprise video data of an entity performing the task, such as a robot or human being placing a particular object in an environment in a particular location in the environment. The video data may comprise at least two frames covering the time when the task is performed. The observation of the task may be taken to be a demonstration of the task. The sensory data may be captured from any sensor located in the environment where the task is being performed. For example, as well as, or instead of, video data, the observation may comprise pose data, location data, motor control data, data from objects within the environment, touch or contact data, audio data, and the like.

At block 720, a task embedding is generated based on the at least one observation. This may comprise processing sensory data from the observation. This processing may be performed by a trained neural network architecture. This architecture may comprise a task embedding network as previously described. The sensory data may be processed and supplied to the trained neural network architecture in a numeric form, e.g. as one or more n dimensional arrays, where n is greater or equal to 1. An image representing a frame of video data may be supplied as one or two dimensional array of values, e.g. video data may be processed such that each frame is an array of size x*y*c, wherein x is an image width, y is an image height, and c is a number of colour channels. The task embedding may comprise an array of numeric values of a predefined size (e.g. 10-128). The size of the task embedding may vary according to the implementation and may be set as a configurable parameter. For image data processing, the trained neural network architecture may comprise a convolutional neural network architecture.

Blocks 710 and 720 represent a so-called "demonstration" phase where a task embedding is generated for a task. This may be performed at a different time to blocks 730 to 750. In one case, blocks 730 to 750 may be applied to an obtained task embedding. For example, a task embedding may be loaded from memory and supplied to perform blocks 730 to 750. Blocks 730 to 750 represent a "test" or "performance" phase, where a robotic device is instructed to perform a task that is represented by a task embedding. The performance phase is performed in a second context. The second context may differ from the first context. For example, a task may be demonstrated in a first environment having a first location and configuration of objects and it may be desired to perform this task in a second environment having a second location and configuration of objects. In certain cases, the first and second contexts may comprise a common environment, e.g. a common location, at different times, and/or with different sets of objects present in the environment. "Objects" in this sense may refer to living and non-living entities, and both static and dynamic objects.

Some non-limiting examples of a task that is demonstrated in a demonstration phase and then imitated in a performance phase comprise: opening a door in two different environments (e.g. using a robotic arm), assembling two parts in a test setting and a manufacturing setting, placing a particular object in a particular receptacle in a first setting and placing the same object in the same receptacle in a different setting, moving to a particular object (e.g. a red cross) in different environments, performing a sequence of motor actions in a simulated environment and performing the same sequence of motor actions in a real-world environment, etc.

Blocks 730 to 750 in FIG. 7 are configured to be repeated for successive actions to be performed by the robotic device in the second context. The robotic device may be the same entity that features in the observation received at block 710, or it may be a different entity. For example, the robotic device that is used in relation to blocks 730 to 750 may comprise a real-world device, whereas the entity of the observation may comprise a simulation of the same device; or the robotic device that is used in relation to blocks 730 to 750 may attempt to imitate actions performed by a human being that features in the observation.

At block 730, sensory data associated with the robotic device in the second context is received at a time preceding a given action. The sensory data may comprise: a frame of video data featuring the robotic device and motor kinematic data, such as arm joint angles, end-effector positions, joint velocities, pose measurements and the like for the robotic device shown in FIG. 2. In an initial run of blocks 730 to 750, the sensory data may comprise an observation of the robotic device in the second context and an initial motor configuration for the robotic device.

At block 740, the task embedding and the sensory data are mapped to control instructions for the robotic device for the given action. This mapping may be performed by a trained neural network architecture that takes the task embedding and the sensory data as input, e.g. in the form of arrays of numeric values. The task embedding may have the same value for each repetition of block 740, while the sensory data may change as the robotic device interacts with the environment and/or as the environment changes over time. The control instructions may comprise an array of numeric values that are used to drive the robotic device, such as one or more of: desired motor or joint angles, desired motor or joint velocities, desired key-point or joint positions, and desired pose configurations. The control instructions may or may not be in the same format as any motor kinematic data received at block 730. A neural network architecture used to perform the mapping may have numerous configurations depending on the implementation. For example, if the sensory data comprises image data, the trained neural network architecture may comprise convolutional layers, where an output of one or more layers, plus any non-linearities, may be combined with one or more outputs of feed-forward layers, plus any non-linearities, applied to other sensory data such as motor kinematic data.

At block 750, the robotic device is instructed to perform the given action using the control instructions. This may comprise effecting a motor configuration represented in a one- or multi-dimensional array of numeric values. Blocks 730 to 750 may be performed synchronously or asynchronously. In the former case, a system clock may dictate when sensory data is received and when the action is performed. In the latter case, the blocks may be performed sequentially as soon as processing is completed, e.g. once motor feedback indicates that the control instructions have been actuated, then a request for sensory data may be sent and block 730 performed.

In certain cases, the at least one observation of a task comprises image data for at least two time steps. The at least two time steps cover a time period in which the task is performed in the first context. For example, the two time steps may comprise t=0 and t=T, where the task is performed in T time units. The image data may be representative of at least one image showing the robotic device performing the task in the first context. For example, it may comprise a frame of video data at a given time, where a video capture device is located so as to observe the robotic device. The sensory data associated with the robotic device may comprise at least one of image data representative of at least one image showing the robotic device performing the task in the second context and state data for the robotic device. As discussed above, the state data may comprise motor configuration and/or kinematic data. The control instructions may comprise instructions for one or more actuators of the robotic device to enable movement of the robotic device in the second context. The movement may comprise movement of one or more portions of the robotic device, such as joints of the robotic arm in FIG. 2, and/or a change of location of the robotic device within the environment of the second context.

The method 700 of FIG. 7 may be performed using trained neural network architectures, e.g. to perform one or more of blocks 720 and 740. In one case, the trained neural network architectures comprise a task embedding network to generate the task embedding at block 720 and a control network to map the task embedding and the sensory data to the control instructions for the robotic device at block 740. These networks may comprise implementations of the previously described task embedding network and control network. The control network may use a policy to perform this mapping, e.g. as used in reinforcement learning approaches.

The trained neural network architecture may be initialised to perform the method 700 by loading parameters for each of the task embedding network and the control network. These parameters may have values that are set via a training procedure. The training procedure may be performed locally or remotely at a point in time prior to receiving the at least one observation. For example, the training may be performed by locally processing a training set or by processing a training set at a remote location and sending the parameter values to a local implementation of the trained neural network architecture. The parameters may have values resulting from joint training of the task embedding network and the control network on training data comprising training samples of a plurality of training tasks. Each training sample may comprise one or more observations of a given training task being performed and corresponding actions taken to perform the training task. For example, a plurality of training samples may be supplied for each of a plurality of tasks. Each training sample may comprise a tuple comprising observation data and action data, wherein the observation data and action data may comprise a numeric representation (e.g. a multidimensional array of values). The observation data may be of the same form as the observation data that is received at block 710 and/or block 730. The action data may share a form with the sensory data received at block 730 and/or the control instructions generated at block 740. Each training sample may be generated by recording an entity (e.g. a human being or a programmed robotic device) performing an associated task in a given environment. Each training sample may comprise a trajectory of observation and action data, e.g. a sequence of tuples that extend over the time the task is performed (e.g. time steps 0 to T).

In one case, the training of the task embedding network and the control network is performed jointly, i.e. parameters for both networks are optimised in a common or shared training procedure where errors for one network may be used in a loss function for the other network. Training the networks jointly enables a richer and more meaningful task embedding, e.g. the task embedding may be optimised to have greater utility for the control network by using a control loss for the control network in training for the task embedding network.

FIG. 8 shows a training iteration 800 for joint training of a task embedding network and a control network. The training iteration generates a loss value $L_i$ to enable optimisation of parameters for the task embedding network and the control network. For example, the aim of training may be to minimise the loss value and errors from training are back-propagated through the two networks, which are differentiable, to update the values of the parameters for a training iteration, e.g. based on a gradient of a loss function that computes the loss value. FIG. 8 shows a method for performing a training iteration that is provided as an example; various other methods may alternatively be used and variations from the method of FIG. 8 are envisaged. The training iteration 800 shown in FIG. 8 may be used to implement the training shown in FIG. 4.

At block 810, a set of training tasks from a set of training data are sampled. For example, if the training data comprises trajectories for a plurality of tasks, where each task has training data relating to multiple trajectories, then block 810 may comprise selecting a subset of tasks. Sampling may comprise taking a random sample of the tasks (e.g. where each task has an equal likelihood of being selected for the set of training tasks). A batch size may be defined to set the number of tasks that are in the set of training tasks. Sampling tasks enables a manageable training iteration but may be omitted in certain examples, e.g. the set of training tasks may comprise all tasks in the training data.

In the present example, blocks 820 to 840 are repeated for each given task in the set of training tasks. At block 820, a support set for the given task is determined. A support set comprises a first set of observations of the robotic device performing the task. The observations may be sampled from a set of example observations for the task. For example, the support set may be generated by obtaining at least observation data from a randomly sampled subset of trajectories. The size of the support set may be a configurable parameter. The support set for a given task represents a group of examples of the given task, e.g. they may be taken as "describing" a task. Each example of a task may differ (e.g. may have different environment configurations, may represent the task performed at different times, and/or may represent different attempts at performing a common task). At block 830, a query set for the given task is determined. The query set comprises a second set of observations of the robotic device performing the given task, where the first and second set of observations are disjoint (i.e. the support set and the query set for a task are disjoint). The sampling of the query set may be similar to the sampling for the support set, with the disjoint constraint applied. The query set represents one or more examples of a task, e.g. the query set is used to test the ability of the network to perform the task. At block 840, the task embedding network is used to compute a task embedding for the support set and a task embedding for the query set. This may comprise an operation similar to block 720 in FIG. 7. For multiple examples, e.g. in the support set, the task embeddings for each example (e.g. as computed using an initial and final frame of video data from the example) may be combined using an aggregate function. The aggregate function may be an average or mean function, e.g. such that an aggregate task embedding for the support set comprises a mean of the task embeddings for each individual example in the support set.

Once blocks 820 to 840 have been repeated for all the tasks in the set of training tasks, block 850 is performed to initialise a loss function for the task embedding network and the control network. This may comprise setting a loss value, or components of a loss value, to zero. Blocks 860 to 880 are then repeated for each task in the set of training tasks using the support set and query set from blocks 820 and 830, and the task embeddings from block 840.

At block 860, a task embedding loss is determined. The task embedding loss results from a loss function term for the task embedding network. The loss function term for the task embedding network compares examples of a particular task with examples of different tasks, such that optimisation of the loss value separates different tasks in a task embedding space. In one case, the loss function term for the task embedding network compares the task embeddings of the one or more examples in the query set with the aggregate task embeddings of both the support set for the given task and support sets for different tasks. For example, a hinge loss function with a configurable margin may be used. The hinge loss function may enable task differentiation in embedding space as described with reference to FIG. 6. The hinge loss function may compare a first similarity measure between a task embedding for the query set for the given task and a task embedding for the support set for the given task with a second similarity measure between the task embedding for the query set for the given task and a task embedding from a set of task embeddings for support sets for tasks that are not the given task. Summations may be performed over the examples in the query set and for support sets of different tasks. In one case, a query set task embedding may be compared with each support set task embedding for all tasks in set of training tasks that are not the given task, and this may be repeated for each example in the query set. The similarity measure may comprise a cosine distance between the two task embeddings.

At block 870, a control loss is determined for the support set. The control loss results from computing at least one loss function term for the control network. In this case, there are two loss function terms. The at least one loss function term compares control instructions predicted by the control network with control instructions for actions actually taken to perform the given task. At block 870, the loss function term comprises a policy loss term for the support set for a given task. This may comprise, for examples in the support set, computing a difference between the policy as applied to the support set task embedding and a particular time step in the example (e.g. a particular observation-action pair) and an "expert" or ideal policy as applied to the same time step in the example. In practice, the latter expert policy may be represented by the value of the action in the particular observation-action pair. Hence, block 870 may comprise applying the control network to the support set task embedding and observations from the examples and comparing the output of this with the actions from the examples. The loss value may be computed as a L2 distance for each example or trajectory in the support set. One or more time steps may be compared. At block 880, a similar calculation is performed to determine a control loss for the query set. This may comprise applying the same operations to the examples of the query set. Block 880 may comprise computing a policy loss term for the query set for the given task. Computing a control loss for both the support set and the query set has advantages: the support set control loss complements the learning using the query set loss (minimising the support set loss may be seen as an easier version of minimising the query set loss as example dependent information may be passed through the embedding space); and it provides a desired property of being able to repeat a given examples (e.g. the support set confirms learning performed with regard to the query set).

Each repetition of blocks 860 to 880, and the results from each block, may be summed to compute the loss value $L_i$. In certain cases, a weighting may be applied to the results from each of blocks 860 to 880, where the weights are hyperparameters for the networks. The output of the training iteration, $L_i$, may be used to iteratively optimise the loss function to determine parameter values for the task embedding network and the control network.

In the example methods described herein, the task embedding provides a representation of the task. For example, the task embedding may be seen to be a learnt latent representation of characteristics of a task that are expressed in numeric form (e.g. as float values). Training results in task embeddings for two tasks that have a shared set of characteristics being closer in an embedding space than task embeddings for two tasks that have a differing set of characteristics. Training may involve sampling a set of unique tasks in a batch, and "negative" embeddings or sentences may be generated from all the other tasks in the batch, e.g. each task in the batch may be compared to every other task in the batch. For any hinge loss a margin may be set as a configurable parameter (e.g. in a range of 0.01 to 1). In certain cases, a trained task embedding network may be used to classify tasks. Accuracy of this classification may be estimated by performing a nearest-neighbour search within embedding space over other tasks in the batch. Although a hinge loss is used in this example, e.g. with a dot product similarity measure, other loss functions may be used in other examples, such as an L2 loss or the like.

Figure 9:
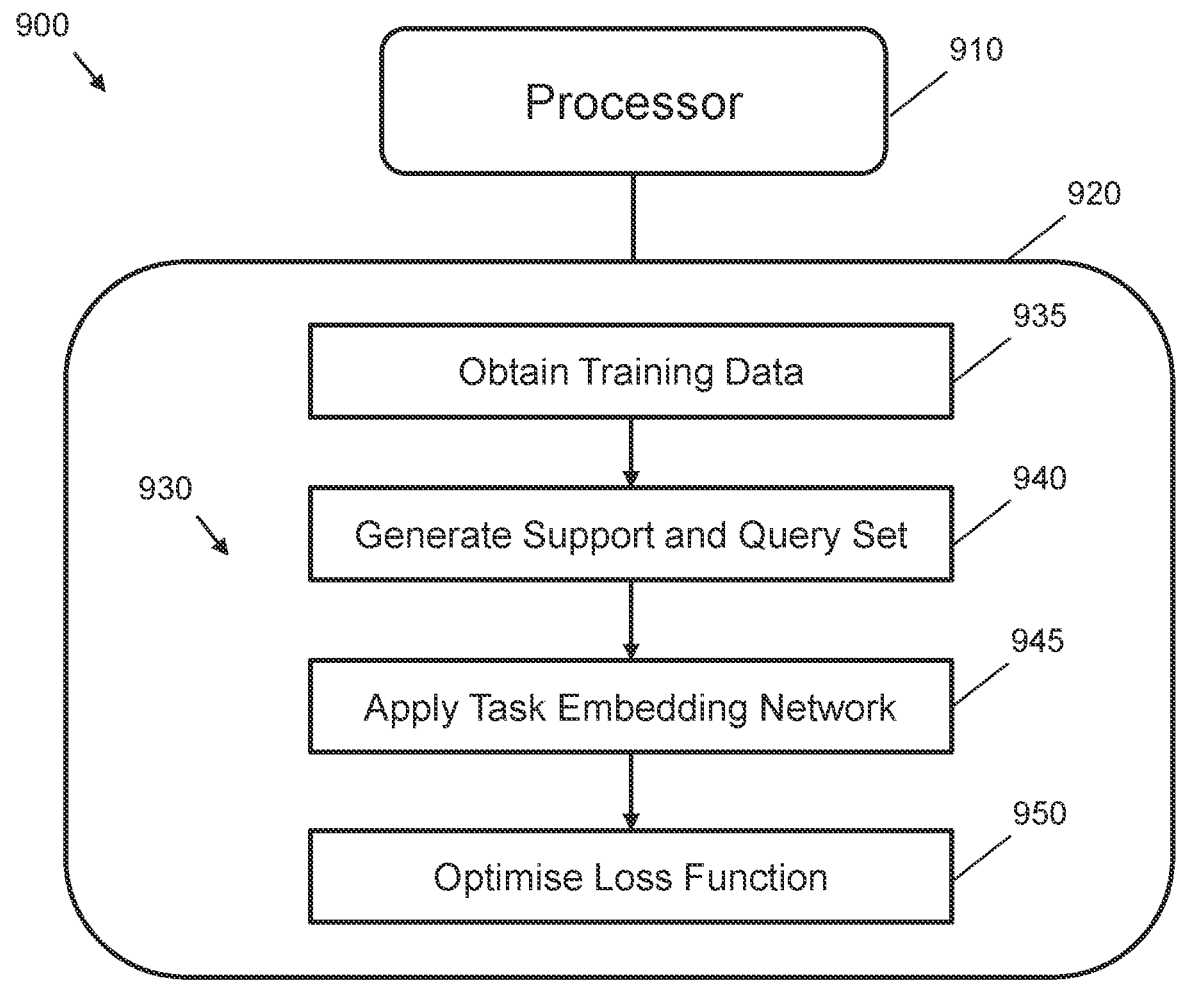
FIG. 9 is a schematic illustration showing a non-transitory computer readable medium containing computer program instructions according to an example.

FIG. 9 shows an example 900 of a processor 910 and a non-transitory computer-readable storage medium 920 comprising computer-executable instructions 930. The computer-executable instructions, when executed by the processor 910, cause a computing device, such as a computing device comprising the processor 910, to train a task embedding network. The instructions may result in a method being performed that is similar to the example methods described above.

Via instruction 935, training data is obtained for a control system comprising at least a task embedding network. The task embedding network is configured to map input data to a task embedding. The task embedding network may comprise a task embedding network as described in any of the previous examples. The training data may comprise observation-action data pairs for one or more tasks that are performed in one or more contexts by a controllable device. The controllable device may comprise a robotic device and may or may not be the same device as the aforementioned computing device, e.g. a computing device comprising the processor 910 may execute the instructions 930 to control a communicatively coupled robotic device, or to produce a trained task embedding network that may be used to embed tasks to control one or more remote devices.

Via instructions 940, a support set and a query set are generated for each of a set of training tasks represented within the training data. The support set and the query set may be generated as described with reference to blocks 820 and 830 of FIG. 8. Instructions 940 may instructing the processor to, for a given task in the set of training tasks, apply the task embedding network to a first set of observation-action pairs for the given task to generate a support set task embedding, and apply the task embedding network to a second set of observation-action pairs for the given task to generate a query set task embedding, the first and second set of observation-action pairs being disjoint. The observation-action pairs may comprise time steps for a task trajectory. In certain case, only observation data may be used to compute the task embedding. The support set task embedding and/or the query set task embedding may comprise an aggregate task embedding as described above.

Via instructions 950, a loss function for the control system is optimised to determine values for trainable parameters for the control system. The loss function for the control system in this case is a function of a loss function for the task embedding network, where the loss function for the task embedding network is based on a comparison of similarity measures for the support set and the query set. The loss function may be a loss function similar to that computed in block 860 in FIG. 8. A similarity measure between the query set task embedding for a given task and the support set task embedding for the given task may be compared to a similarity measure between the query set task embedding for the given task and a support set task embedding for a task that is not the given task. The loss function for the task embedding network may comprise a hinge loss function and the similarity measure may comprise a dot-product similarity.

In certain cases, the control system comprises a control network to apply a policy to map the input data and the task embedding from the task embedding network to action data for the controllable device. In this case, the loss function for the control system is a function of a loss function for the control network and the loss function for the control network for a given task comprises a policy loss for the support set and a policy loss for the query set. For example, the loss function for the control system may be computed as explained with reference to blocks 870 and 880 in FIG. 8.

In certain cases, observation data within each of the observation-action data pairs comprises image data representative of at least one image featuring the controllable device that is captured prior to an action associated with the observation-action data pair, respectively. In this case, the observation data is captured during performance of a task.

The instructions 930 result in a set of trained parameters for at least a task embedding network. The task embedding network may then be applied to observation data showing a task being performed by a robotic device in a first context to generate a task embedding for the task. The task embedding may represent the task in a manner that abstracts from the first context, e.g. provides a latent representation that is not strongly influenced by the particular features of the first context that may change in other contexts. The task embedding may be seen as a form of high-level instruction for a robotic device, e.g. it may be supplied to a control network to enable the control network to control a robotic device to perform the task. The control network may control the robotic device by iteratively mapping the task embedding and sensory data for the robotic device in a second context to a sequence of control actions for the robotic device. In these cases, the sensory data is updated and remapped following performance of a control action in the second context.

In certain cases, examples as described herein may be used in a simulated-to-real context, where a goal is to learn policies for a control network within a simulation and then transfer these to a real-world environment with little or no additional training. This may reduce a need for cumbersome and time-consuming data collection in the real world. During simulation, randomisation may be applied, e.g. to vary factors such as lighting location, camera position, object texture, object sizes and object shapes. This provides training data that enables meaningful abstract task embeddings to be learnt.

Certain examples described herein provide an approach to meta-learning that enables end-to-end one-shot (or at least few-shot) imitation learning. Certain examples described herein learn a compact description of a task via an embedding network, that can be used to condition a control network to predict action for a different example of the same task. Example control systems may be trained in simulation and then deployed in the real world. Once deployed, a robotic device may continue to learn new tasks from single or multiple demonstrations. By configuring the tasks that are included in a training set, a task embedding network is able to generalise over a broad range of tasks.

In certain examples, new tasks may be learnt based on visual data. This enables robotic devices to learn to imitate tasks performed manually by human operators, without a need for expert actions or states to be present at test or performance time.

The above examples are to be understood as illustrative. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A control system for a robotic device comprising:
   a task embedding network to:
      receive one or more demonstrations of a task; and
      generate a task embedding, the task embedding comprising a representation of the task in a task embedding space, each demonstration comprising one or more observations of a performance of the task,
   wherein the task embedding network is trained using a loss function that compares a demonstration of a first task with a demonstration of a second task, the first task being different from the second task, such that the task embedding network learns to map the first task and the second task to respective different regions of the task embedding space; and
   a control network to receive the task embedding from the task embedding network and to apply a policy to map a plurality of successive observations of the robotic device to respective control instructions for the robotic device,
   wherein the policy applied by the control network is modulated across the plurality of successive observations of the robotic device using the task embedding from the task embedding network.

2. The control system of claim 1, wherein the task embedding network and the control network each comprise respective parameters resulting from joint training on a training set comprising training samples of at least one training task in at least one environment, each training sample comprising one or more observations of a given training task in a given environment and corresponding actions performed by the robotic device in the given environment.

3. The control system of claim 1, wherein:
   at least one of the task embedding network and the control network are trained on a training set comprising training samples of at least one training task;
   the at least one training task comprises a first task; and
   the task received by the task embedding network is a second task, different from the first task, such that the control network is configured to apply the policy to map the plurality of successive observations of the robotic device to the respective control instructions for the robotic device to perform the second task.

4. The control system of claim 1, wherein:
   the one or more demonstrations of the task comprise one or more observations of the performance of the task in a first environment,
   the control instructions comprise control instructions for the robotic device to perform the task in a second environment, the first and second environments having at least different configurations, and
   the plurality of successive observations of the robotic device comprise observations of the robotic device in the second environment.

5. The control system of claim 1, wherein the one or more observations of the performance of the task comprise image data representative of at least one image of the robotic device performing the task and wherein the control instructions comprise motor control instructions for one or more motors of the robotic device.

6. The control system of claim 1, wherein the task embedding network and the control network each comprise respective parameters resulting from joint training on a training set comprising training samples of at least one training task in at least one simulated environment, each training sample comprising one or more observations of a given training task in a given simulated environment and corresponding actions performed by a simulation of the robotic device in the given simulated environment.

* * * * *